Dec. 20, 1955
W. N. PLATTE
2,727,969
WELDING APPARATUS
Original Filed March 17, 1950
3 Sheets-Sheet 1
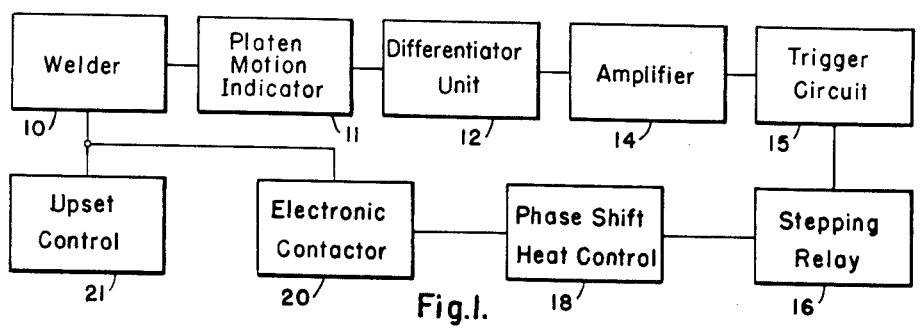
Fig.1.
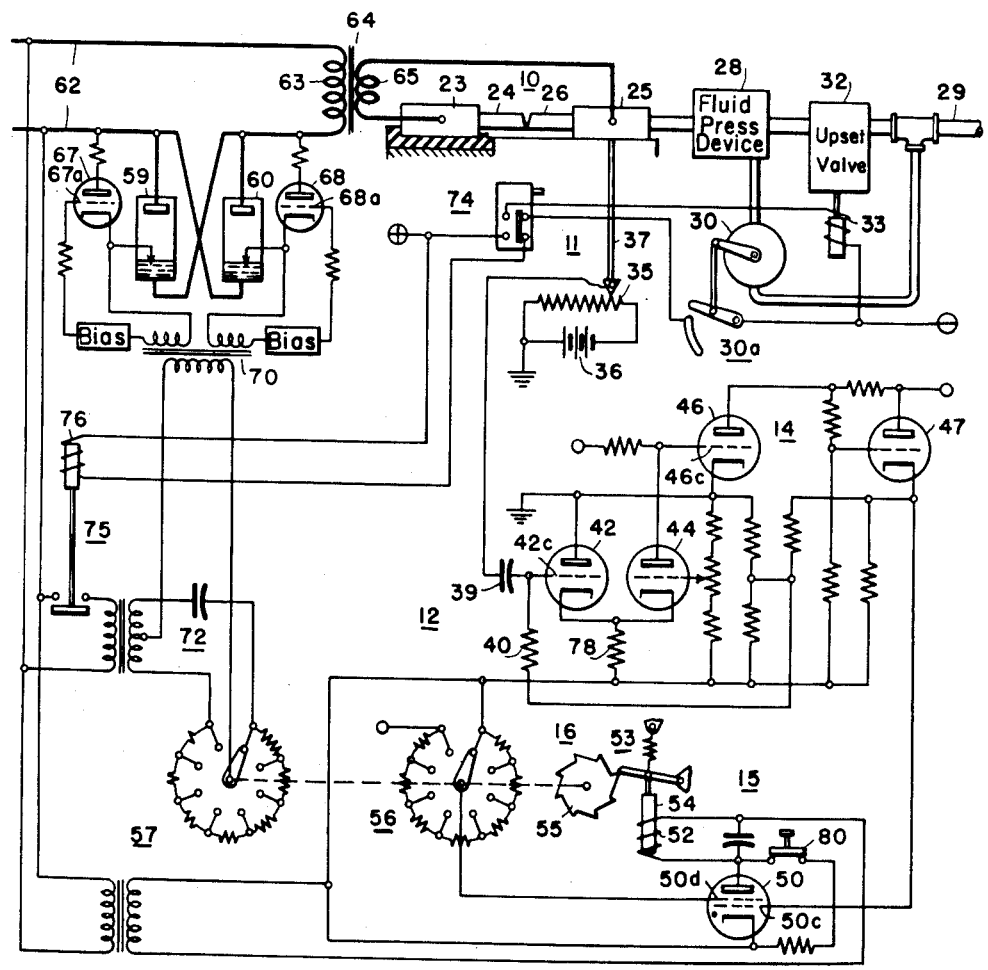
Fig.2.
Fig.3.
INVENTOR
William N. Platte.
BY
Hymen Diamond,
ATTORNEY Dec. 20, 1955  W. N. PLATTE  2,727,969
WELDING APPARATUS Original Filed March 17, 1950  3 Sheets-Sheet 2

INVENTOR
William N. Platte.
BY
Hymen Diamond
ATTORNEY

Dec. 20, 1955 W. N. PLATTE 2,727,969
WELDING APPARATUS
Original Filed March 17, 1950 3 Sheets—Sheet 3

INVENTOR
William N. Platte.
BY
ATTORNEY

United States Patent Office 2,727,969
Patented Dec. 20, 1955

2,727,969

WELDING APPARATUS

William N. Platte, McKeesport, Pa., assignor to Westinghouse Electric Corporation, East Pittsburgh, Pa., a corporation of Pennsylvania Original application March 17, 1950, Serial No. 150,293, now Patent No. 2,677,037, dated April 27, 1954. Divided and this application September 23, 1953, Serial No. 381,770

9 Claims. (Cl. 219—4)

This application is a division of my Patent 2,677,037 for Welding Apparatus, issued April 27, 1954, and assigned to Westinghouse Electric Corporation.

My invention disclosed herein relates, generally, to welding and it has reference, in particular, to apparatus for and methods of flash welding.

Generally stated, it is an object of my invention to provide an improved method of and apparatus for flash welding, which are both inexpensive and reliable and effective in operation.

More specifically, it is an object of my invention to provide, in a flash welding system, for progressively varying the relation between the rate of flashing and the flashing voltage.

Another object of my invention is to provide, in a flash welding system, for varying the relation between the flashing voltage and the rate of flashing to compensate for increasing temperature conditions during flashing.

Yet another object of my invention is to provide, in a flash welding system, for maintaining the flashing voltage as near as possible to a minimum operating value so as to minimize the formation of craters in the surfaces of the pieces being welded.

One important object of my invention is to provide, in a flash welding system, for varying the flashing voltage simultaneously with the rate of flashing so as to also maintain the flashing voltage at a predetermined minimum value necessary to maintain satisfactory flashing conditions.

It is also an important object of my invention to provide, in a flash welding system, for using a constant flashing voltage and varying the rate of flashing to maintain a desired predetermined relation between the flashing voltage and the rate of flashing.

A further object of my invention is to provide, in a flash welding system, for utilizing a flashing voltage which is varied while maintaining a substantially constant flashing rate so as to maintain a predetermined relation between the flashing voltage and the rate of flashing.

Other objects will in part be obvious, and will in part be explained hereinafter.

For a more complete understanding of the nature and scope of my invention, reference may be made to the following detailed description, which may be read in connection with the accompanying drawings, in which:

Figure 1 is a block diagram of a welding system embodying the invention in one of its forms;

Fig. 2 is a diagrammatic view of the welding system of Fig. 1;

Fig. 3 shows characteristic curves illustrating the relationship between the minimum value of flashing voltage for effecting satisfactory flashing, and the flashing time;

Figure 4:
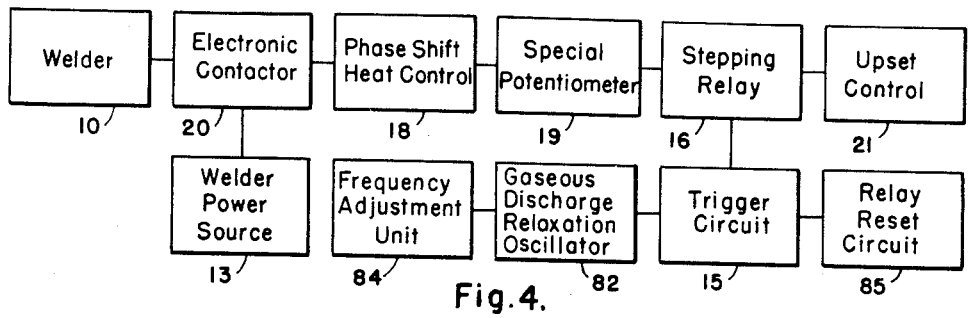
Fig. 4 is a block diagram of a welding system embodying the invention in another of its forms.

Referring to Fig. 1, the reference numeral 10 may denote, generally, a flashing welding machine of a type well known in the art provided with fixed and movable platens or jaw members. A platen motion indicator 11 may be utilized to produce a voltage which varies with movement of the movable platen, and which is applied to a differentiator unit 12, amplified by an amplifier 14, and then applied to a trigger circuit 15 for effecting operation of a stepping relay 16. The stepping relay, in turn, may operate a phase shift heat control circuit 18 for controlling the operation of an electronic contactor 20 to vary the voltage applied to the welder 10. An upset control 21 controls the operation of the electronic contactor to terminate the flashing voltage and effect rapid movement of the welder platen to produce upset of members being welded.

Referring to Fig. 2, it will be seen that the welder 10 may comprise a fixed platen 23 for securing one of the members 24 which is to be welded, and a movable platen 25 for securing the other member 26 to be welded. Suitable means may be provided for operating the movable platen 25 such as, for example, a fluid pressure actuating device 28 which may be connected to a source of fluid pressure, represented by the conduit 29, by a flashing valve 30, which may be operable to admit fluid to the device 28 at different rates in different operating positions. An upset valve 32 having an operating winding 33 may be provided for admitting fluid to the device 28 at a relatively high rate in order to effect upset of the members 24 and 26 to terminate a welding operation.

The platen motion indicator 11 may comprise a resistance device 35 disposed to be connected across a source of voltage such as the battery 36, having a movable tap 37 which may be operatively connected to the movable platen 25 so as to provide a control voltage which changes in accordance with the position of the platen. This voltage may be applied to the differentiator unit 12, which comprises a CR circuit, including a capacitor 39, and a resistor 40, which may be connected to the control grid 42c of a valve device 42. An additional valve device 44 may be used in conjunction with the valve device 42 to invert the output voltage thereof for applying it to the amplifier 14 which may comprise a pair of valve devices 46 and 47.

The trigger circuit 15 may comprise a valve device 50 of the gas filled type having its control grid 50c connected to render the device responsive to the cathode voltage of the amplifier 14. The valve device 50 may be utilized to control the energization of the operating winding 52 of the stepping relay 16. The stepping relay may be of any suitable type well known in the art comprising, for example, a ratchet mechanism 53 disposed to be actuated by an armature 54 for operating a star wheel 55 connected in circuit relation with the screen grid 50d of the valve device 50 for changing the bias thereon to effect cutoff of the valve device each time it is rendered conductive to step the relay 16.

The electronic contactor 20 may comprise a pair of arc discharge devices 59 and 60 connected in the well-known inverse relation for controlling the flow of current from an alternating current source represented by the conductors 62 to the primary winding 63 of a welding transformer 64 having a secondary winding 65 connected to the platens 23 and 25 for producing a flashing voltage therebetween.

The conductivity of the arc discharge devices 59 and 60 may be controlled in any suitable manner, such as by means of valve devices 67 and 68 having their control electrodes 67a and 68a connected through a control transformer 70 and a phase shift circuit 72 including the potentiometer device 57 to the source conductors 62.

In order to provide for maintaining a predetermined relation between the valve of the flashing voltage and the flashing rate, the potentiometer 57 may comprise tapered steps which may be calibrated so as to produce a flashing voltage having a relation to the flashing time in accordance with curves such as the curves a and b of Fig. 3, which show the relation between the minimum open circuit value of the flashing voltage and the flashing time for producing satisfactory flashing between members of ¼ inch and ⅛ inch bar stock, respectively.

Control of the upset valve 32 may be effected by suitable means such as a limit switch 74, which may be actuated from the movable platen 25 after a predetermined amount of platen movement. Control of the welding current may be effected by utilizing a control switch 75 having an operating winding 76 disposed to be normally energized upon operation of the flash valve 30 which starts the flashing operation. The control switch 75 may be deenergized through operation of the limit switch 74 so as to terminate the welding current approximately when the upsetting operation takes place.

In operation, the flash valve 30 may be actuated to any desired operating position to admit pressure fluid to the pressure device 28 for actuating the movable platen toward the stationary platen 23 at a desired rate. The control switch 30a is thereby actuated to the closed position, completing an obvious energizing circuit for the operating winding 76 of the switch 75. This applies control voltage through the phase shift circuit 72 to the control electrodes of the valve devices 67 and 68, so as to render the arc discharge devices 59 and 60 conductive, thereby applying flashing voltage between the members 24 and 26 which are to be welded.

As the platen 25 moves, the movable contact member 37 of the platen motion indicator 11 moves along the resistance 35, thus varying the voltage applied to the differentiator 12. The changing voltage applied to the CR circuit 12 and to the control grid 42c of the valve device 42 produces a cathode voltage across the cathode resistor 78 which is proportional to the rate of change of position of the platen 25. This cathode voltage varies the conductivity of the inverter valve device 44 and applies a corresponding control voltage to the control grid 46c of the valve device 46 of the amplifier 14. The cathode voltage of the valve device 47 of the amplifier 14 is applied to the control grid 50c of the valve device 50 of the trigger circuit. This renders the valve device conductive, energizing the operating winding 52 of the stepping relay 16 so as to actuate it one step and change the position of the potentiometer device 57 so as to reduce the flashing voltage.

At the same time, the potentiometer device 56 is actuated one step, thus increasing the negative bias applied to the screen grid 50d of the valve device 50. This increase will be sufficient to render the valve device nonconductive. As the platen 25 continues to move, the platen motion indicator 11 continues to change the voltage applied to the differentiator unit 12, and the valve device 50 of the trigger circuit will, accordingly, be again rendered conductive to step the relay 16 another step. This operation continues until the limit switch 74 is actuated to interrupt the energizing circuit for the operating winding 76 of control switch 75, and provide an obvious energizing circuit for the operating winding 33 of the upset valve 32. Flashing voltage is thereupon removed from the pieces 24 and 26, and the movable platen 25 is actuated rapidly toward the stationary platen 23 to effect upset of the members which are being welded.

The stepping relay may be reset in any suitable manner, such as by means of a reset push button switch 80, which provides an obvious energizing circuit for the operating winding 52 of the stepping relay.

Referring to Fig. 4, the reference numeral 10 may again designate, generally, a flash welding machine which may be connected to a source of welding current 13 by means of an electronic contactor 20 whose conductivity may be controlled by a phase shift heat control 18 through a potentiometer 19 under the control of a stepping relay 16 operated from a trigger circuit 15. Operation of the trigger circuit 15 may be effected by means of an oscillator 82 of the relaxation type, having a frequency control circuit 84. Operation of the trigger circuit to reset the stepping relay may be effected by means of a reset circuit 85. Upset may be effected by controlling the upset control 21 through operation of the stepping relay 16.

Figure 5:
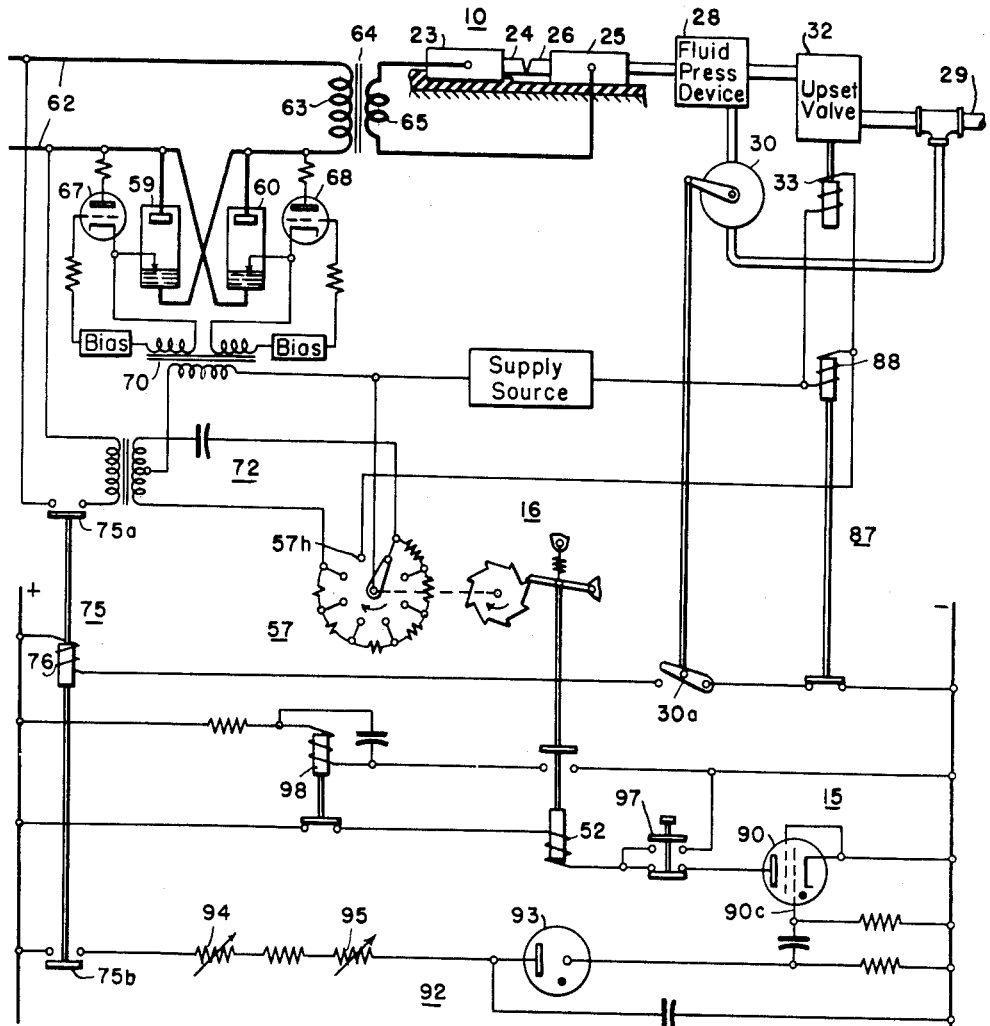
Fig. 5 is a diagrammatic view of the welding system of Fig. 4.

Referring to Fig. 5, the reference numeral 10 denotes, generally, the flash welding machine wherein pieces 24 and 26 which are to be flash welded together, are secured in stationary and movable platens 23 and 25, respectively. Operation of the movable platen 25 may be provided for by means of a fluid pressure actuating device 28 which may be connected to a source of pressure fluid 29 through a flashing valve 30 disposed to admit fluid pressure to the device 28 at a predetermined rate. An upset valve 32 having an operating winding 33 may be provided for admitting pressure fluid to the device 28 at a relatively high rate for effecting upset of the members 24 and 26.

The platens 23 and 25 may be connected to a source of alternating current represented by the conductors 62, by means of arc discharge devices 59 and 60 which control the supply of welding current to the primary winding 63 of a welding transformer 64 having a secondary winding 65 connected between the platens. Conductivity of the arc discharge devices 59 and 60 may be controlled by means of valve devices 67 and 68 in a well-known manner, by control voltages derived from a control transformer 70 which may be connected to the source conductors 62 through a phase shift circuit 72 including a potentiometer 57 which may be calibrated in accordance with curves similar to those shown in Fig. 3 for varying the flashing voltage in accordance with the flashing time.

A control switch 75 may be utilized to control the connection of the phase shift circuit 72 to the source conductors 62 for terminating the flow of welding current. Operation of the control switch 75 may be provided for by utilizing a control switch 30a operatively connected with the flashing valve 30 for commencing a welding operation. A heat cut-off relay 87 having an operating winding 88 connected in parallel circuit relation with the operating winding 33 of the upset valve may be utilized to interrupt the operating circuit of the control switch 75 for terminating the flow of welding current upon upset.

Control of the flashing voltage may be effected by actuating the potentiometer device 57 by means of the stepping relay 16 in a manner similar to that heretofore described in connection with the welding system of Fig. 2. Operation of the stepping relay 16 is controlled by the trigger circuit 15, which may comprise a valve device 90 of the gaseous type for controlling the energization of the operating winding 52 of the stepping relay. Operation of the trigger circuit 15 may be effected by utilizing means such as the relaxation oscillator 92, comprising, for example, a valve device 93 of the gaseous type having adjustable resistance means 94 and 95 in its anode circuit for varying the frequency of oscillation so as to apply periodic voltage pulses to the control grid 90c of the valve device 90 for rendering it conductive.

Reset of the stepping relay 16 may be effected by utilizing a reset push button switch 97 for completing an energizing circuit for the operating winding 52 of the stepping relay independently of the trigger circuit 15. A cut-off relay 98 may be utilized for interrupting the circuit completed by the reset push button switch, so as to effect a stepping action of the relay 16.

In operation, the flash valve 30 may be actuated to apply fluid pressure to the pressure device 28 for actuating the movable platen 25 at a predetermined rate, which has an optimum value on the order of .03 to .04 inch per second for ⅛ inch and ¼ inch flat bar stock. Operation of the flashing valve 30 closed contact member 30a to provide an obvious energizing circuit for the operating winding 76 of the control switch 75. The phase shift circuit 72 is thereby connected to the soure conductors 62 through contact member 75a and flashing voltage is applied between the members 24 and 26 which are to be welded.

Operation of the control switch 75 connects the relaxation oscillator 92 to a source of control voltage through contact member 75b so as to periodically render the trigger circuit 15 conductive. The stepping relay 16 will, therefore, be periodically actuated so as to change the operating position of the potenitometer device 57 and vary the flashing voltage in predetermined relation with the flashing time.

When the potentiometer device 57 reaches its final operating position, a circuit will be provided through contact member 57h for simultaneously energizing the operating winding 33 of the upset valve 32 and the operating winding 88 of the heat cut-off relay 87. Fluid is thereupon applied at a relatively high rate to the fluid pressure device 28 for upsetting the members 24 and 26. Operation of the cut-off relay 87 interrupts the energizing circuit of the operating winding 76 of the control switch 75 and disconnects the phase shift circuit 72 from the source conductors, thus terminating the flow of welding current. At the same time the oscillator 92 is deenergized.

Reset of the stepping relay 16 may be effected by closing the reset push button switch 97, which disconnects the trigger circuit from the source and provides an obvious energizing circuit for the operating winding 52 of the stepping relay. The stepping relay operates, actuating the potentiometer device 57 and completing an obvious energizing circuit for the cut-out switch 98, which interrupts the energizing circuit for the operating winding 52. The stepping relay thereupon returns to the deenergized position as shown and interrupts the energizing circuit of the cut-off switch, which returns to the deenergized position and again completes an energizing circuit for the stepping relay.

Figure 6:
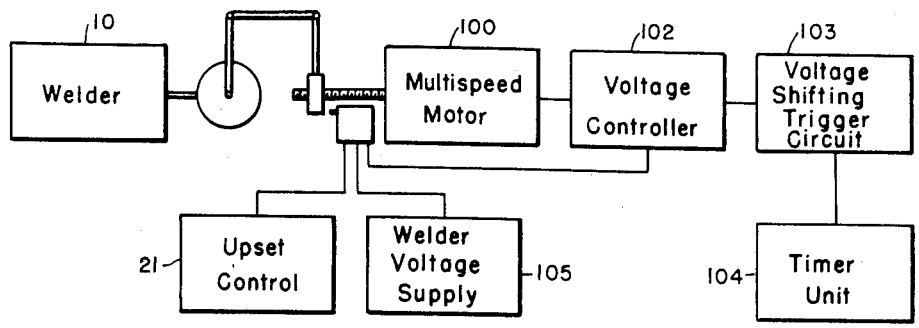
Fig. 6 is a block diagram of a welding system embodying the invention in yet another of its forms.

Referring to Fig. 6, reference numeral 10 may denote, generally, a flash welding machine of a suitable type having a variable or multi-speed motor 100 for varying the rate of platen movement. A voltage controller 102 may be utilized to regulate the voltage applied to the motor under the control of a voltage shifting trigger circuit 103, which may be controlled by a timer unit 104. Upset may be effected by means of an upset control 21, electrical energy being supplied to the welder from a supply source 105.

Figure 7:
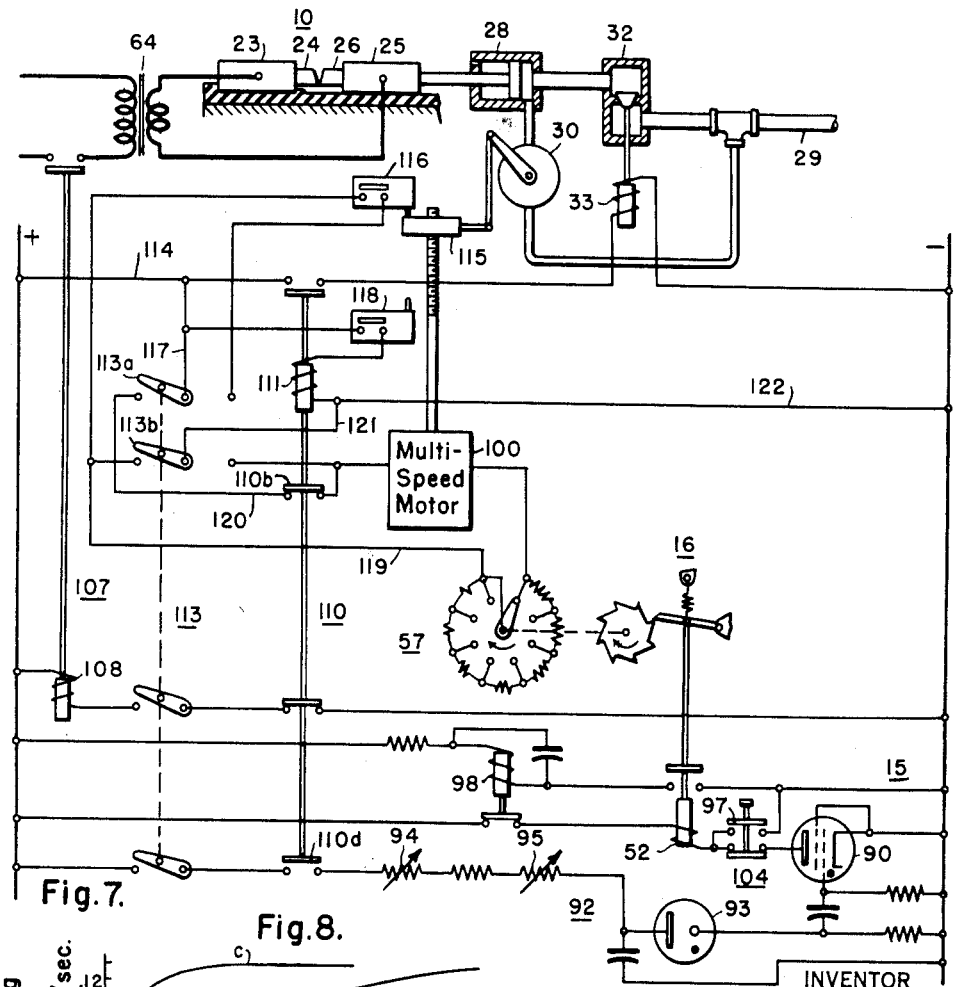
Fig. 7 is a schematic diagram of the welding system of Fig. 6.

Referring to Fig. 7, it will be seen that the welder 10 may comprise, as described hereinbefore, stationary and movable platens 23 and 25 for securing work pieces 24 and 26 which are to be flash welded together. Operation of the movable platen 25 may be effected by means of fluid pressure actuating means 28 which may be connected to a source of fluid pressure represented by the conduit 29 by a flash valve 30 and an upset valve 32 having an operating winding 33 for actuating the valve to connect the pressure means 28 directly to the source 29.

Welding current may be supplied to the welder 10 from a source 105 by a welding transformer 64 in a manner well known in the art. Connection of the transformer 64 to the source 105 may be effected by means of a main switch 107 having an operating winding 108. Control of the main switch 107 may be effected by utilizing a control relay 110 having an operating winding 111 disposed to be energized to open the main switch at the time upset is effected. Operation of the main switch may be effected by means of a start switch 113 which provides an obvious energizing circuit for the operating winding 108.

Figure 8:
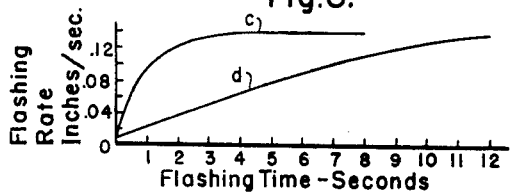
Fig. 8 shows characteristic curves illustrating the relation between flashing rate and flashing time for the system of Fig. 7.

With the voltage from a source 105 being substantially constant it has been found desirable to vary the flashing rate between the members 24 and 26 to maintain the predetermined relation of minimum flashing voltage to flashing time, such as represented by the curves c and d in Fig. 8. This result may be attained by operating the flash valve 30 by means such as the multi-speed motor 100 which actuates the flash valve to admit pressure fluid at different rates, by means of a traveling nut 115.

Operation of the traveling nut may be utilized to actuate a limit switch 116 at a predetermined point in its travel to provide a reset circuit for the valve actuating mechanism. An additional limit switch 118 may be utilized to provide an operating circuit for the control relay 110 to terminate the flow of welding current.

Operation of the motor 100 may be effected by utilizing a potentiometer device 57 which may be calibrated to vary the energization of the motor in accordance with the characteristic curves such as shown in Fig. 8. Operation of the potentiometer device 57 may be effected by means of the stepping relay 16 in a manner hereinbefore described under the control of the timer unit 104, which may include a trigger circuit 15 and an oscillator 92 of the relaxation type.

The trigger circuit 15 may comprise a valve device 90 connected in circuit relation with the operating winding 52 of the stepping relay to energize it periodically in accordance with oscillations from the valve device 93 of the oscillator 92. The rate of oscillation may be controlled by means of resistors 94 and 95 connected in circuit with the valve device 93.

Reset of the stepping relay may be effected by means of a reset push button switch 97 which connects the operating winding 52 for energizing independently of the trigger circuit 15. A cut-off relay 98 may be utilized in connection with the push button switch 97 for interrupting the energizing circuit of the operating winding 52 to effect a stepping action.

In operation, the control switch 113 may be actuated to the closed position thus providing an obvious energizing circuit for the operating winding 108 for the main switch 107. The main switch thereupon connects the welding transformer 64 to the source 105. An energizing circuit for the motor 100 will also be provided, extending from positive through conductor 114, conductor 117, contact member 113a, conductor 120, contact member 110b, the motor 100, potentiometer device 57, conductor 119, contact member 113b, conductor 121 and conductor 122 to the negative side of the source. The motor operates, actuating the traveling nut 115 at a relatively high speed to open the flash valve 30, and commence the flashing operation. As the traveling nut moves downward, limit switch 116 closes to set up a reset circuit for the valve operating mechanism.

The stepping relay 16 functions at predetermined intervals of time as determined by the frequency of oscillation of the oscillator 92 to operate the potentiometer device 57 to different positions in succession. This progressively changes the speed of the motor 100 and opens the flash valve 30 at an initially high rate which tapers off so as to increase the flashing rate between the members 24 and 26, according, for example, to curve C of Fig. 8.

When the traveling nut actuates the limit switch 118, control relay 110 will be energized, interrupting the energizing circuit for the operating winding 108 of the main switch. The main switch opens and disconnects the welding transformer from the source. At the same time the operating circuit for the motor 100 is interrupted at contact member 110b while the oscillator 92 is disconnected from the source at contact member 110d.

The traveling nut 15 may be reset by operating the switch 113 to reverse position so as to provide an operating circuit for the motor 100 through contact members 113a and 113b and the right-hand stationary contacts. When the traveling nut reaches the position in which it is shown, limit switch 116 will be opened to interrupt the energizing circuit for the motor whereupon the equipment is returned to its initial position ready for the next operation.

From the above description and the accompanying drawings, it will be apparent that I have provided, in a simple and effective manner, for maintaining a predetermined relation between the flashing voltage and the rate of flashing in flash welding. By utilizing the embodiments of my invention, these conditions may be maintained regardless of whether a constant flashing voltage is used, a constant flashing rate or a variable flashing rate. The features of my invention may be readily applied to existing apparatus as well as being incorporated in new equipment. By changing the calibration of the potentiometer 57, different flashing rates and different values of flashing voltage may be obtained for welding different materials.

Since certain changes may be made in the above-described construction, and different embodiments of the invention may be made without departing from the spirit and scope thereof, it is intended that all matter contained in the above description and shown in the accompanying drawings shall be considered as illustrative and not in a limiting sense.

I claim as my invention:

1. In a control system for a flash welding machine having relatively movable jaw members disposed to secure members to be flash welded and having actuating means disposed to move the jaw members toward each other at a substantially constant rate, circuit means connecting the jaw members to a source of flashing voltage, and control means operable to vary said voltage at predetermined intervals of time in accordance with a predetermined pattern based on an inverse relation with the temperature of the members being welded.

2. In a control system for a flash welding machine having relatively movable jaw members disposed to secure members to be flash welded, a pulse generator, circuit means connecting the jaw members to a source of flashing voltage, control means operable to vary the flashing voltage, and a stepping relay operable in response to pulses from the pulse generator to actuate said control means.

3. In a control system for a flash welding machine having relatively movable jaw members disposed to normally effect predetermined relative movement of members to be flash welded and upset means operable to effect rapid relative movement of said jaw members, circuit means including electronic contact means disposed to connect the jaw members to a source of alternating current, phase shifting means operable to vary the voltage applied to said jaw members, a pulse generator operable to produce pulses of electrical energy, and a stepping relay operable in response to said pulses to actuate the phase shifting means and effect operation of the upset means.

4. A control system for a flash welder having a pair of relatively movable jaws disposed to secure members to be flash welded, circuit means disposed to connect the jaws to a source of flashing voltage, control means operable to vary the rate of relative movement of the jaws, and circuit means including relay means connected to effect periodic operation of the control means to vary the rate of jaw movement.

5. The combination with a flash welding machine having jaws disposed to secure members to be flash welded and actuating means for effecting relative movement of said jaws provided with valve actuable means to control the rate of relative movement, of a variable speed motor operable to actuate the valve means, control means including a rheostat operable to vary the speed of the motor, a stepping relay operable to effect operation of the rheostat, and circuit means including a pulse generator connected to effect operation of the stepping relay.

6. The combination with a flash welding machine having relatively movable jaws disposed to secure members to be flash welded, of electric valve means disposed to connect the jaws to a source of alternating current voltage, phase shifting means operable to control the conductivity of the valve means and vary the voltage applied to the jaws, a stepping relay operable to effect operation of the phase shifting means, circuit means including a valve device connected to effect operation of the stepping relay, and a pulse generator connected to apply control voltage pulses to said valve device to render it conductive.

7. In combination an electric discharge device having a main electrode and a control electrode; means for impressing a periodic control potential between said control electrode and one of said main electrodes; means, including a stepping relay and means for actuating said relay, for shifting the phase of said potential over a predetermined range in steps of predetermined magnitude; and means responsive to the operation of said stepping relay for stopping the operation of the shifting means after a predetermined number of operations of said stepping relay.

8. In a control system for a flash welding machine having relatively movable jaw members disposed to secure members to be flash welded and having actuating means disposed to move the jaw members toward each other at a substantially constant rate, circuit means connecting the jaw members to a source of flashing voltage, and control means operable to vary said voltage in accordance with a predetermined pattern based on an inverse relation with the temperature of the members being welded.

9. In a control system for a flash welding machine having relatively movable jaw members disposed to secure members to be flash welded and having actuating means disposed to move the jaw members toward each other at a substantially constant rate and also having upset means, circuit means connecting the jaw members to a source of flashing voltage, and control means operable to vary said voltage in accordance with a predetermined pattern based on an inverse relation with the temperature of the members being welded during a predetermined flashing time interval, the said circuit means being characterized by means connected to said upset means and responsive to said control means for actuating said upset means at the end of said interval.

References Cited in the file of this patent

UNITED STATES PATENTS 2,429,186    Johnson et al. _____ Oct. 14, 1947